(12) United States Patent
Oda

(10) Patent No.: US 7,058,883 B1
(45) Date of Patent: Jun. 6, 2006

(54) DOCUMENT LINK DESCRIPTION/GENERATION METHOD, APPARATUS AND COMPUTER PROGRAM PRODUCT

(75) Inventor: Toshihiko Oda, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 762 days.

(21) Appl. No.: 09/708,599

(22) Filed: Nov. 9, 2000

(30) Foreign Application Priority Data

Nov. 9, 1999 (JP) ................................ 11-317668

(51) Int. Cl.
*G06F 17/00* (2006.01)
*G06F 15/00* (2006.01)
*G06F 17/21* (2006.01)
*G06F 17/24* (2006.01)

(52) U.S. Cl. .................... 715/501.1; 715/514; 715/515; 715/516

(58) Field of Classification Search ............. 715/501.1, 715/538, 513
See application file for complete search history.

(56) References Cited

U.S. PATENT DOCUMENTS

| | | | |
|---|---|---|---|
| 5,204,947 A * | 4/1993 | Bernstein et al. ........... 345/854 |
| 5,297,249 A * | 3/1994 | Bernstein et al. ........... 345/854 |
| 5,572,730 A | 11/1996 | Oda | |
| 5,933,822 A * | 8/1999 | Braden-Harder et al. ...... 707/5 |
| 6,038,378 A * | 3/2000 | Kita et al. ..................... 714/38 |
| 6,098,081 A * | 8/2000 | Heidorn et al. .......... 715/501.1 |
| 6,424,962 B1 * | 7/2002 | Billon .......................... 706/61 |
| 6,600,749 B1 * | 7/2003 | Hayball et al. ............. 370/400 |

FOREIGN PATENT DOCUMENTS

| | | |
|---|---|---|
| JP | 2000-67035 | 3/2000 |
| WO | WO 9847307 A1 * | 10/1998 |

OTHER PUBLICATIONS

Loke, Seng Wai, and Davison, Andrew; Logic Programming with the World-Wide Web; May 14, 1996; Department of Computer Science at the University of Melbourne.*
Davison, Andrew and Loke, Seng Wai; LogicWeb: Enhancing the Web with Logic Programming; Dec. 23, 1996.*

* cited by examiner

*Primary Examiner*—William Bashore
*Assistant Examiner*—N. Hillery
(74) *Attorney, Agent, or Firm*—Oblon, Spivak, McClelland, Maier & Neustadt, P.C.

(57) ABSTRACT

An operation of describing a document link for linking a first document of a link source and a second document of a linking destination. An abstract link is described in the first document of the link source, and the abstract link describes a link establishing condition for determining the document link between the first document of the link source and the second document of the linking destination on a basis of a retrieval of document information of the first document of the link source and the second document of the linking destination.

6 Claims, 4 Drawing Sheets

```
<AbstractLink Role=term explanation>
  <link establishing condition>
    link source element ($y)←
      Document ($x)∧DocumentLocation ($x,"./")∧Document-
      Name ($x,"invention application document.txt")∧
      DocumentElement ($x,$y)∧DocumentElementName
      ($y,"keyword")∧
      DocumentElementAttribute ($y,"name",$keyword)
    link destination element ($b)←
      Document ($a)∧DocumentLocation ($a,"../doc/")∧Document-
      Name ($a,"term dictionary.txt")∧DocumentElement ($a, $b)
      ∧DocumentElementName ($b,"term item")∧DocumentElement
      Attribute ($b,"term name",$keyword)
  </link establishing condition>
</AbstractLink>
```

FIG. 4

```
<AbstractLink Role=term explanation>
<link establishing condition>
link source element ($y)←
    Document ($x)∧DocumentLocation ($x,"./")∧Document-
    Name ($x,"invention application document.txt")∧
    DocumentElement ($x,$y)∧DocumentElementName
    ($y,"keyword")∧
    DocumentElementAttribute ($y,"name",$keyword)
link destination element ($b)←
    Document ($a)∧DocumentLocation ($a,"../doc/")∧Document-
    Name ($a,"term dictionary.txt")∧DocumentElement ($a, $b)
    ∧DocumentElementName ($b,"term item")∧DocumentElement
    Attribute ($b,"term name",$keyword)
</link establishing condition>
</AbstractLink>
```

US 7,058,883 B1

DOCUMENT LINK DESCRIPTION/GENERATION METHOD, APPARATUS AND COMPUTER PROGRAM PRODUCT

CROSS-REFERENCE TO RELATED DOCUMENTS

The present document claims priority on and contains subject matter related to Japanese Patent Application No. 11-317688 filed in the Japanese Patent Office on Nov. 9, 1999, and the entire contents of which are hereby incorporated herein by reference.

BACKGROUND OF THE INVENTION

1. Field of the Invention

The present invention relates to a document link description method, a document link generating apparatus, and a computer program product, that realize a plurality of document links by describing one abstract link.

2. Discussion of the Background

In the present specification, an electronic document edited and created on a computer and stored in a storage medium is referred to as a document. Generally, documents, not only paper documents but also electronic documents, contain information having an internal structure, such as, for example, a hierarchical structure constituted by logical elements, such as, chapters and verses. In a hypertext document description language, such as a SGML (Standard Generalized Markup Language), an XML (Extensible Markup Language), or a HTML (Hypertext Markup Language), each logical element is expressed by a tag. Particularly, in the XML, a peculiar document type (i.e., a document structure rule) can be easily defined for each document class, and further, recognition of the document structure and extraction of the document information can be easily realized by a document processing program.

In a hypertext document, information for linking a document to another document is described within each document using one of the above-described document description languages. A user can refer to and read related information in a plurality of documents using a browser that has a function to update the display of a computer to a linking destination document from the displayed document.

Conventionally, when defining a document link in a hypertext document description language, such as the XML or the HTML, the location information of a document element desired to be linked, such as the location of a file of a document including the document element, the name of the document element, and the structural position of the document element in the document, is described at a link source document element. That is, such location information of a linking destination is described for each link.

For example, when defining a link for a technical term in a document to a description sentence in a technical term dictionary, the location information of the linking destination (i.e., the name of the dictionary and the position of the technical term in the dictionary) must be described for each appearance of the technical term in the document. This creates a problem that repetitive operations for describing the linking information are necessary for a document and also creates a problem that the size of the document is increased because of the added linking information. In addition, when the document at the linking destination is changed, for example when the structure or the location of the document is changed, the description of the linking information has to be changed accordingly, which is also troublesome.

SUMMARY OF THE INVENTION

The present invention has been made in view of the above-discussed and other problems and addresses the above-discussed and other problems.

Preferred embodiments of the present invention provide a novel document link description method, apparatus, and computer program product, that reduces labor in describing a document link and that reduces the size of a link description document file.

According to a preferred embodiment of the present invention, a method of describing a document link for linking a first document of a link source and a second document of a linking destination includes a step of describing an abstract link in the first document of the link source. The abstract link describes a link establishing condition for determining the document link between the first document of the link source and the second document of the linking destination on a basis of retrieval of document information of the first document of the link source and the second document of the linking destination.

According to the present invention, the abstract link may describe the nature of document elements of the first document of the link source and the second document of the linking destination according to a Horn clause predicate expression.

Further, the abstract link may derive the document elements of the first document of the link source and the second document of the linking source satisfying the link establishing condition on a basis of a backtrack evaluation and a calculation to bind a variable based upon the document information retrieval.

Furthermore, the abstract link may be described using an atom predicate.

According to another preferred embodiment of the present invention, a document link generating apparatus for linking a first document of a link source and a second document of a linking destination includes an abstract link extracting device configured to extract, from the first document of the link source, an abstract link describing a link establishing condition for determining the document link between the first document of the link source and the second document of the linking destination on a basis of retrieval of document information of the first document of the link source and the second document of the linking destination. Also, a document link generating device generates the document link based upon the extracted abstract link.

In the above-described apparatus, the abstract link may describe the nature of document elements of the first document of the link source and the second document of the linking destination according to a Horn clause predicate expression.

Further, the abstract link may derive the document elements of the first document of the link source and the second document of the linking destination satisfying the link establishing condition on a basis of a backtrack evaluation and calculation to bind a variable based upon the document information retrieval.

Furthermore, the abstract link may be described using an atom predicate.

According to still another preferred embodiment of the present invention, a computer program product includes a computer storage medium and a computer program code mechanism embedded in the computer storage medium for causing a computer to control linking a first document of a link source and a second document of a linking destination. The computer program code mechanism includes a first computer code device configured to extract, from the first document of the link source, an abstract link describing a link establishing condition for determining the document link between the first document of the link source and the second document of the linking destination on a basis of retrieval of document information of the first document of the link source and the second document of the linking destination. Also, a second computer code device is configured to generate the document link based upon the extracted abstract link.

Accordingly, according to the present invention, a description of a plurality of document links is realized by describing only one abstract link, and thereby the labor of describing the document link is reduced and the size of a document link description file is reduced.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIGS. 4, 5, and 6 are diagrams illustrating exemplary document files for explaining a document linking operation of the document processing apparatus.

DETAILED DESCRIPTION OF THE PREFERRED EMBODIMENTS

Figure 1:
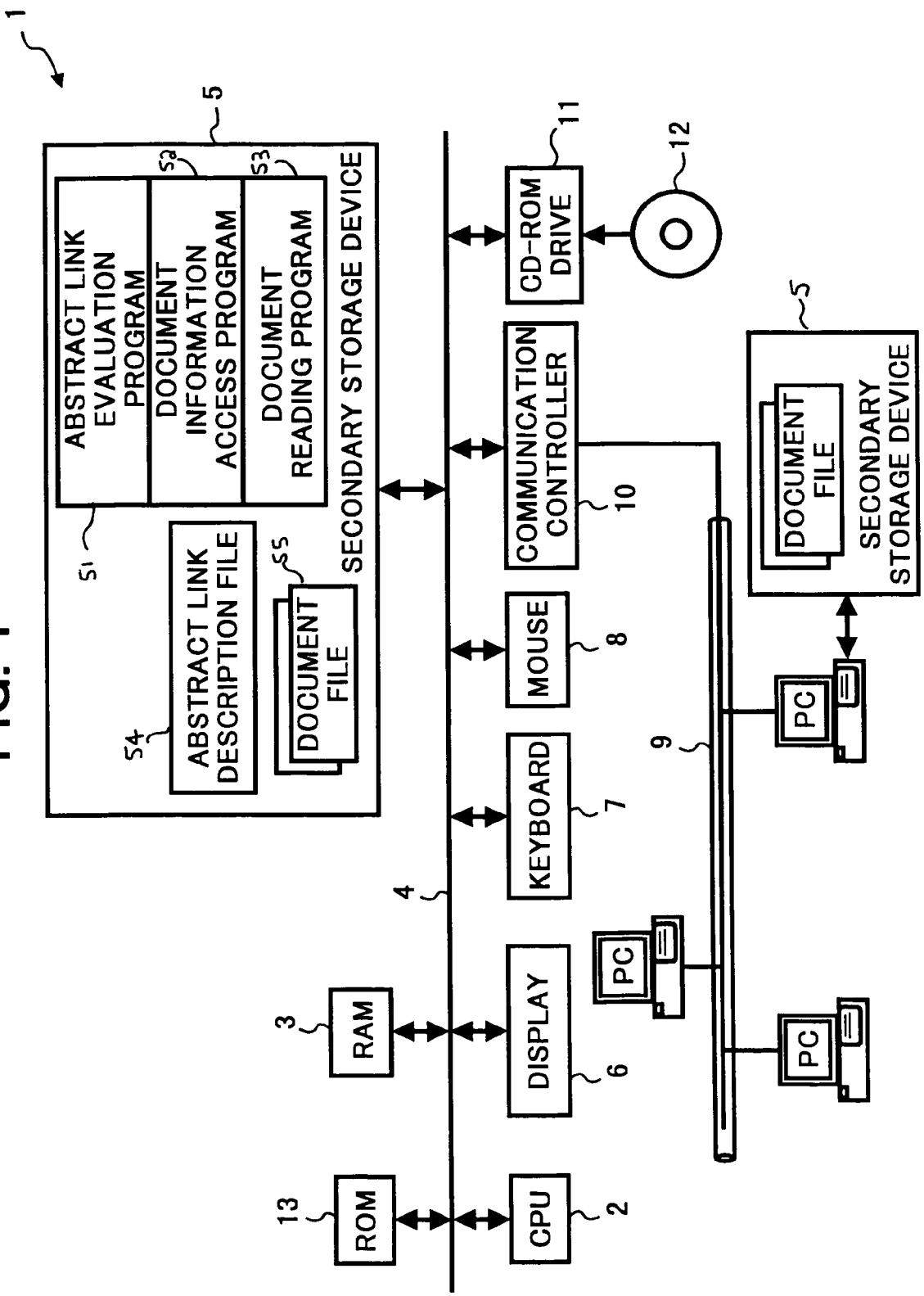
FIG. 1 is a block diagram illustrating a hardware construction of a document processing apparatus according to a preferred embodiment of the present invention.

Referring now to the drawings, wherein like reference numerals designate identical or corresponding parts throughout the several views, preferred embodiments of the present invention are described.

FIG. 1 is a block diagram illustrating a hardware construction of a document processing apparatus 1 according to a preferred embodiment of the present invention. The document processing apparatus 1 functions as a document link generating device to generate a document link. As illustrated in FIG. 1, the document processing apparatus 1 includes a CPU 2, a ROM 13, which is a read-only memory storing a BIOS, and a RAM 3, which stores various data in a writable manner and which serves as a working area for the CPU 2, respectively connected with each other via a bus 4. A secondary storage device 5, e.g. a hard disk, a display 6, a keyboard 7, a mouse 8, a communication controller 9 for connecting the document processing apparatus 1 to a network 9, and a CD-ROM drive 11 are also connected to the bus 4 via suitable interfaces.

In the second storage device 5, an abstract link evaluation program 51, a document information access program 52, and a document reading program 53 are stored. These programs are stored in a CD-ROM 12, which is readable with the document processing apparatus 1 via the CD-ROM drive 11, and are loaded to the secondary storage device 5 from the CD-ROM 12. As a storage medium for storing these programs, various media other than the CD-ROM 12, for example, a DVD, a FD, an optical magnetic disk, and other media, can be used. Also, the above-described programs can be down-loaded from a network, such as the Internet, so as to be installed into the secondary storage device 5. In this case, the storage medium of a storage device connected to the network at the transmitting side and storing therein the above-described programs also constitutes a computer program product according to the present invention.

The document information access program finds documents in the secondary storage device 5 or documents accessible via the network 9, reads out the content information of the documents, and extracts the document elements which are designated. The abstract link evaluation program 51 analyzes the abstract link described in an abstract link description file 54 to search the document elements with the document information access program 53, and thereby generates a document link between the documents. The document reading program 53 is a browser for reading a hypertext document in an efficient manner. Each of the above-described programs may operate on a predetermined OS.

Figure 2:
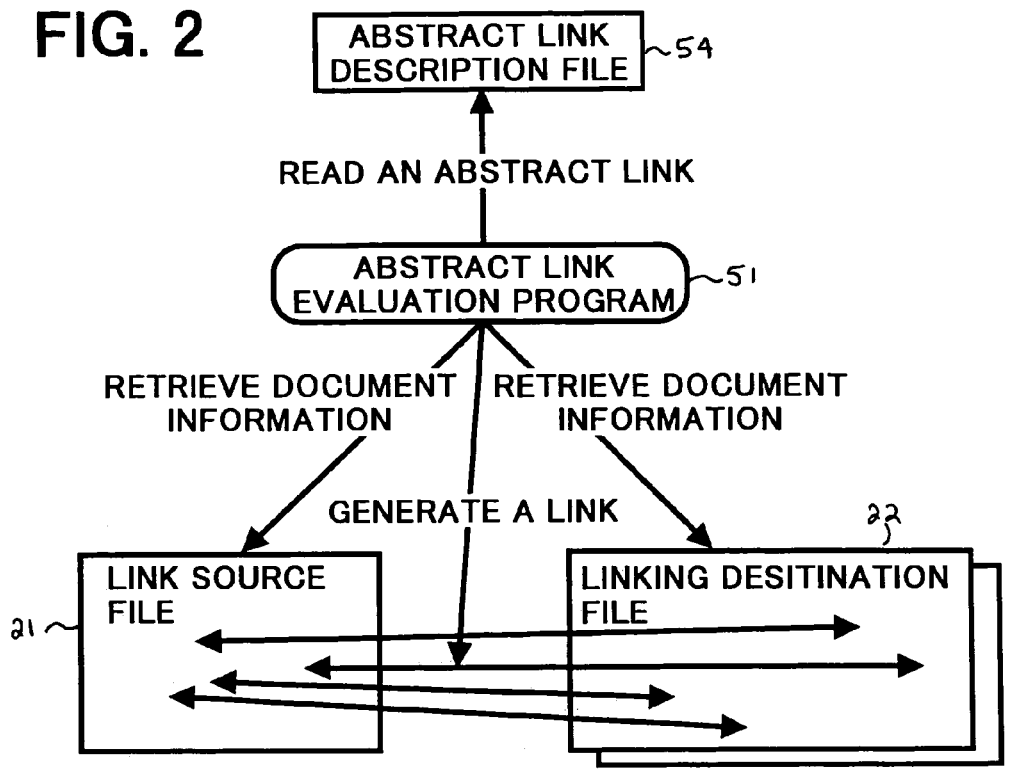
FIG. 2 is a diagram illustrating an outline of a process performed by the document processing apparatus.

FIG. 2 is a diagram illustrating the outline of a process performed by the document processing apparatus 1. As illustrated in FIG. 2, a document link processed by the document processing apparatus 1 is called an abstract link and in the process the locations of a link source file 21 and a linking destination file 22 are not described as in the conventional document link. Instead, the abstract link describes a link establishing condition for determining a document link based upon the document information retrieved from the link source file 21 and the linking destination file 22. The link establishing condition is described in a Horn clause predicate expression described later. When the document link information is needed, for example in reading a document, the abstract link in a document describing the abstract link (i.e., an abstract link description file 54) is read by a process according to the abstract link evaluation program 51, and the document elements of the link source file 21 and the linking destination file 22 satisfying the link establishing condition described in the abstract link are derived from the backtrack evaluation and the document information retrieval. Thereby, the document elements, which are linked with each other as a linking destination and a link source, are determined, and the document link linking the documents elements is generated.

Next, the role and the method of expressing a document link herein referred to as the abstract link are described. Because the abstract link uses an atom predicate, first the atom predicate is described and then the link establishing condition and the abstract link are described.

In the abstract link, the expression method referred to as a predicate expression is used, in which the nature and the relation of a substance are described. Namely, the information about a document and the information about the logical element of the document are described using the predicate expression. The information about a document includes, for example, the document name, the attribute of the document defined in the document, and so forth.

The atom predicate constitutes the main element in the predicate expression. The atom predicate is a finite character row (a predicate) followed by the N (N is an integer not less than 1) number of arguments (constant, variable or function) which are enclosed in parenthesis. An example of the atom predicate is shown below, in which "document name" is the predicate and the variable $x (wherein the alphabetic letter following $ is the variable) and the constant "abc.XML" are the arguments.

$$\text{document name (\$x, ``abc.XML'')} \tag{1}$$

The available kinds of the predicate are dependent on the specification of the document description language. For example, in the XLM document description language, in which a tag expression called XML is used, an XML document is constructed by the hierarchical document elements. Further, the document elements have respective names, and can have a plurality of attributes. A representative predicate in the XML document is described below with each definition. A variable or a constant is given as the argument.

Document (a): "a" is a reference to the substance of a document.

DocumentLocation (a, b): The location of the document reference "a" is "b".

DocumentName (a, b): The name of the document reference "a" is "b".

DocumentElement (a, b): "b" is a reference to the substance of the logical element included in the document reference "a".

DocumentElementName (a, b): The name of the logical element reference "a" is "b".

DocumentAttribute (a, b, c): The attribute "b" of the logical element reference "a" has the attribute value "c".

RouteElement (a, b): The logical element reference at a highest rank of the document "a" is "b".

ChildElement(a, b): The logical element at a lower rank of the logical element "a" is "b".

When two or more atom predicates are arranged with a symbol ∧, the logical connection exists between the atom predicates sandwiching the symbol ∧. Further, the Horn clause includes one atom predicate in the left side of a symbol "←" and the logical connection of the atom predicates in the right side of the symbol. For example, if p, q, r are the atom predicates respectively, the following formula (2) constitutes the Horn clause:

$$p \leftarrow q \wedge r \tag{2}$$

The link establishing condition describes the document elements which are related to each other via a link, using the Horn clause. The link establishing condition includes two Horn clauses, describing the link establishing condition for the link source element and the linking destination element, respectively. An example of the link establishing condition is described below. In the example, two Horn predicates are included, and the formula (3) expresses the link source element and the formula (4) expresses the linking destination element.

$$\text{link source element (\$y)} \leftarrow \text{Document (\$x)} \wedge \text{A DocumentName (\$x, ``abc.XML'')} \wedge \text{DocumentElement (\$x, \$y)} \wedge \text{A DocumentElementName (\$y, ``PPP'')} \tag{3}$$

$$\text{linking destination element (\$b)} \leftarrow \text{Document (}\wedge\text{a)\$} \\ \text{DocumentName (\$\$b, ``xyz.XML'')} \wedge \text{Document-} \\ \text{Element (\$a, \$b)} \wedge \text{DocumentElementName (\$b, ``QQQ'')} \tag{4}$$

What is meant by the above formulas (3) and (4) is that the document link is established between the document element which is included in the document with the name of "abc.XML" and which has the name of "PPP", and the document element which is included in the document with the name of "xyz. XML" and which has the name of "QQQ". The abstract link is a description of a link establishing condition as described above.

Figure 3:
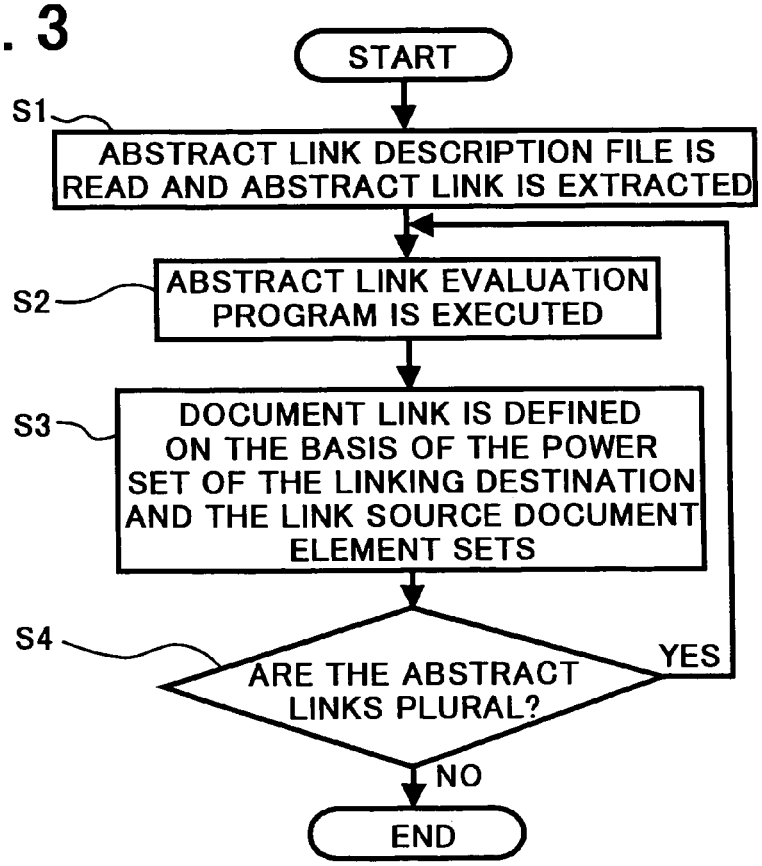
FIG. 3 is a flowchart illustrating an exemplary process of analyzing a document link described with an abstract link.

FIG. 3 is a flowchart illustrating an exemplary process of analyzing the document link described using the abstract link. The process is activated, for example, when reading a hypertext using the document reading program.

First, the abstract link description file 54 as a document file describing the abstract link is read such that the abstract link included in the abstract link description file 54 is extracted (step S1), by which a document link extracting device and a document link extracting step are realized.

Next, an abstract link evaluation process is executed on the abstract link description file 54 (step S2), by which the document information is retrieved on the basis of the link establishing condition, and each set of the document elements of the linking destination and the link source is derived. The basic operation of this process is similar to the one in the logical type program language processing system on the basis of the Horn clause. In the logical type program language processing system, a process, the main part of which is constituted of pattern matching and backtrack evaluations, is performed. However, the pattern matching processing part of the above process of the abstract link evaluation program differs from that in the logical type program language processing system.

The reason is that in the logical type program language processing system, factual data is also described in the predicative expression and therefore can be treated as a predicate pattern, but in the abstract link evaluation process, the factual data is the information about a document or the content of the document existing in a storage device and is not described in the predicative expression and therefore cannot be treated as a predicate pattern. Accordingly, for each kind of the predicates used in the abstract link, a sub-routine for retrieving the document information so as to compare the document information with the predicate is given, and using this sub-routine, the comparison of a predicate and factual data and the variable binding are performed. That is, in the process of the abstract link evaluation program, the link establishing condition is constituted of a backtrack evaluation and a calculation for binding a variable on the basis of document information retrieval.

Then, the document link is defined on the basis of the power set of the document element sets of the linking destination and the link source derived in step S2 (step S3), by which a document link generation step and a document link generation step are realized. When the abstract links are plural (Yes in step S4), the processes of steps S2 and S3 are repeated a plurality of times.

As described above, an abstract link description file 54 includes an abstract link, describing a link establishing condition for determining a document link to link a document file of a link source with a document file of a linking destination on the basis of retrieval of the document information of both document files. Further, the abstract link describes the nature of the document elements of the documents files of the link source and the linking destination according to the Horn clause predicative expression. Furthermore, the abstract link evaluation program is made so as to derive the document elements of the documents files of the link source and the linking destination on the basis of backtrack calculation to bind a variable during document information retrieval. The abstract link is described using an atom predicate.

Figure 5:
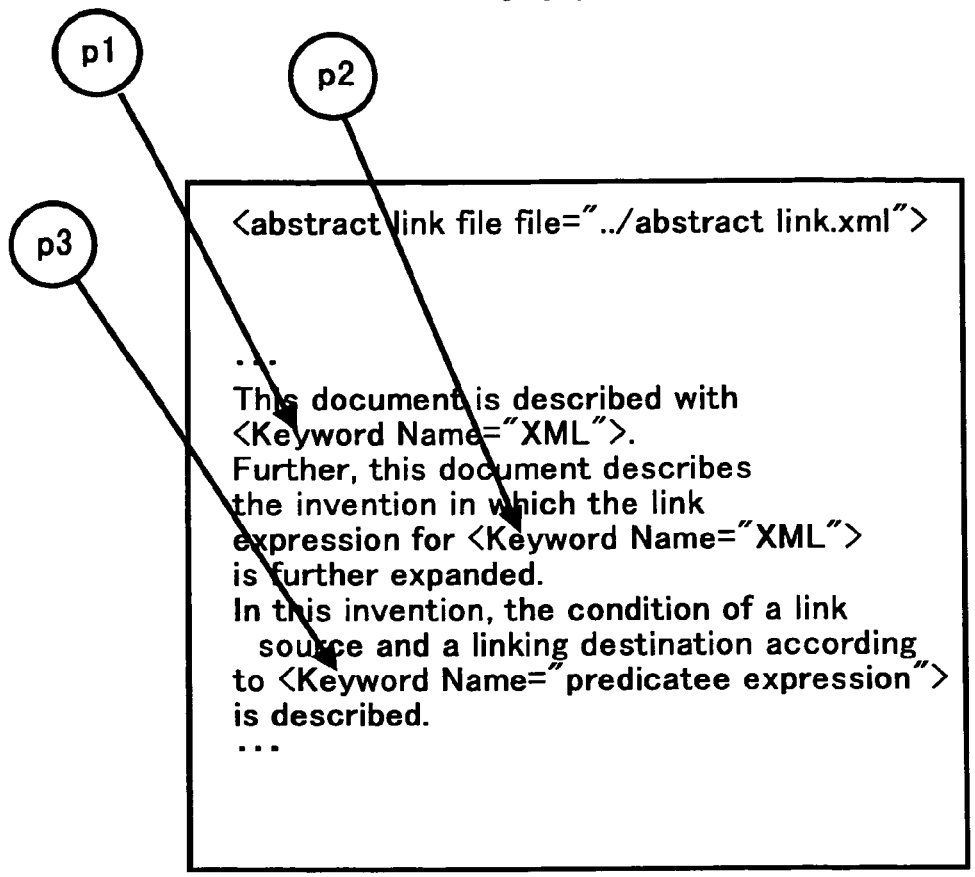
Figure 6:
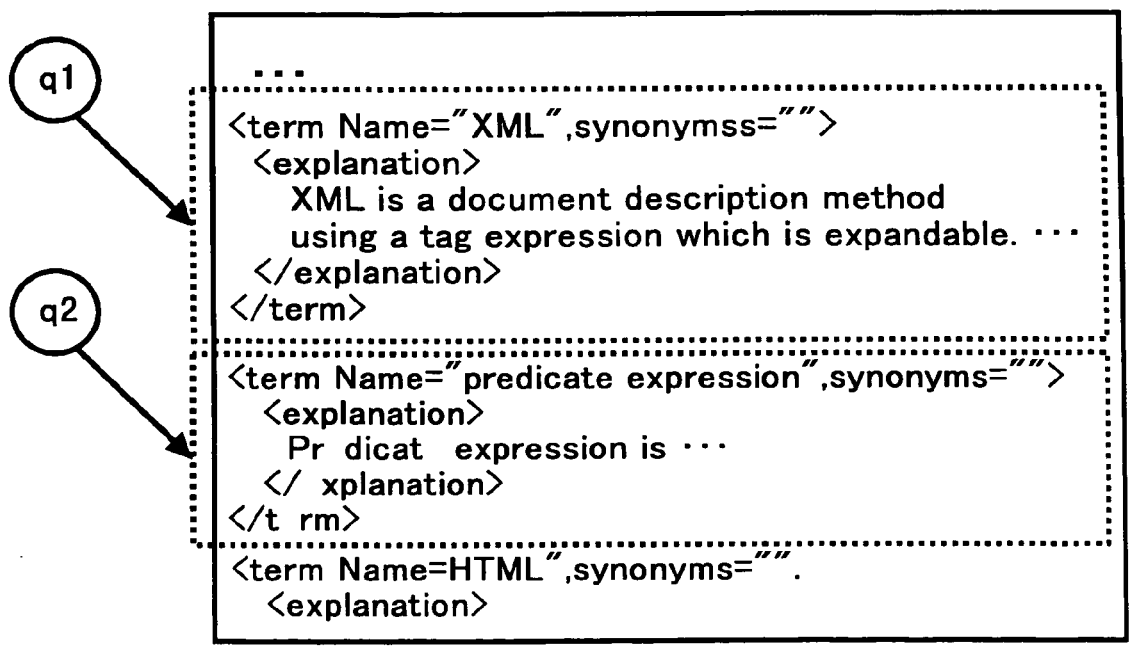

An exemplary linking operation is now described referring to three documents files illustrated in FIGS. 4 to 6. The three documents are described with the XML, one of the document description languages for expressing a document with a tag. In the examples, the definition of a document link from a keyword appearing in a document illustrated in FIG. 5 to a corresponding term explanation in a document illustrated in FIG. 6 is made by an abstract link description file illustrated in FIG. 4. Conventionally, a document link to a corresponding term explanation is described for each keyword. However, according to the above-described embodiment of the present invention, only one abstract link is described.

Then, by calculation of the combination of variable substitution satisfying the link establishing condition with the abstract link evaluation program, the following three combinations of variable substitution are obtained:

substitution example 1: {$keyword="XML", $y=p1, $B=q1};

substitution example 2: {$keyword="XML", $y=p2, $B=q1};

substitution example 3: {$keyword="predicate expression", $y=p3, $B=q2}.

As a result, the three links, one from p1 to q1, another from p2 to q1, and still another from p3 to q2, are derived.

The mechanism and processes set forth in the present description may be implemented using a conventional general purpose microprocessor programmed according to the teachings in the present specification, as will be appreciated to those skilled in the relevant art. Appropriate software coding can be readily prepared by skilled programmers based upon the teachings of the present disclosure, as will also be apparent to those skilled in the art.

The present invention thus also includes a computer program which may be hosted on a storage medium and which includes instructions which can be used to program a microprocessor to perform a process in accordance with the present invention. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

What is claimed is:

1. A computer implemented method for automatically forming a document link that links a portion of a first document with a portion of a second document, the method comprising:

describing at least two characteristics of portions of respective documents using an Atom predicate expression, wherein the portions are less than the whole of each respective document;

describing at least one link establishing condition configured to specify portions of first and second documents to be linked using a Horn clause predicate expression including the Atom predicate;

registering the at least one link establishing condition in a file;

running a prescribed program configured to calculate the at least one link establishing condition while referring to the file; and forming at least one document link between the at least one pair of the portions of the first and second documents, specified by the prescribed program, wherein the at least one link describes a nature of document elements of the first document and the second document, wherein the first document is a link source and the second document is a linking destination.

2. The method of claim 1, wherein the at least one link derives document elements of the first document of the link source and the second document of the linking destination satisfying the link establishing condition on a basis of a backtrack calculation to bind a variable based upon a document information retrieval.

3. A system for automatically forming a document link that links a portion of a first document with a portion of a second document, the system comprising:

a processor including:

means for describing at least two characteristics of portions of respective documents using an Atom predicate expression, wherein the portions are less than the whole of each respective document;

means for describing at least one link establishing condition configured to specify portions of first and second documents to be linked using a Horn clause predicate expression including the Atom predicate;

means for registering the at least one link establishing condition in a file;

means for running a prescribed program configured to calculate the at least one link establishing condition while referring to the file; and means for forming at least one document link between the at least one pair of the portions of the first and second documents, specified by the prescribed program, wherein the at least one link describes a nature of document elements of the first document and the second document, wherein the first document is a link source and the second document is a linking destination.

4. The system of claim 3, wherein the at least one link derives document elements of the first document of the link source and the second document of the linking destination satisfying the link establishing condition on a basis of a backtrack calculation to bind a variable based upon a document information retrieval.

5. A medium storing a computer program product for automatically forming a document link that links a portion of a first document with a portion of a second document, comprising:

a first computer code configured to describe at least two characteristics of portions of respective documents using an Atom predicate expression, wherein the portions are less than the whole of each respective document;

a second computer code configured to describe at least one link establishing condition configured to specify portions of first and second documents to be linked using a Horn clause predicate expression including the Atom predicate, wherein the first document is a link source and the second document is a linking destination;

a third computer code configured to register the at least one link establishing condition in a file;

a forth computer code configured to run a prescribed program configured to calculate the at least one link establishing condition while referring to the file; and a fifth computer code configured to form at least one document link between the at least one pair of the portions of the first and second documents, specified by the prescribed program, wherein the at least one link describes a nature of document elements of the first document and the second document, wherein the first document is a link source and the second document is a linking destination.

6. The medium of claim 5, wherein the at least one link derives document elements of the first document of the link source and the second document of the linking destination satisfying the link establishing condition on a basis of a backtrack calculation to bind a variable based upon a document information retrieval.

* * * * *